United States Patent Office 3,163,545
Patented Dec. 29, 1964

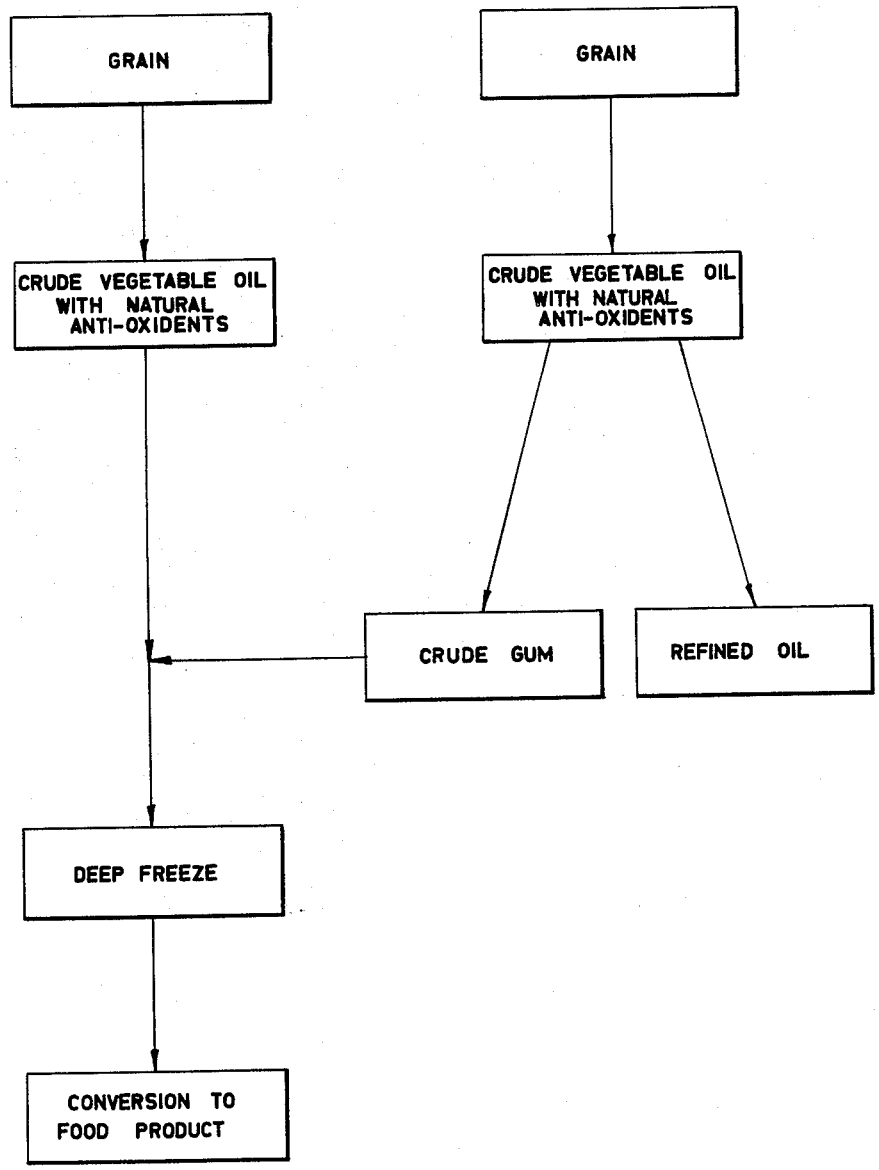

3,163,545
PRODUCING EDIBLE OIL FROM GRAIN
Wayne Martin, 19820 Battersea Blvd., Rocky River, Ohio
Filed Mar. 25, 1960, Ser. No. 17,556
7 Claims. (Cl. 99—192)

The present invention relates to a food product and, more particularly, to an edible oil adapted for use in the preparation of other foods.

It has been stated that the substantial increase in degenerative diseases in the past 30 years, especially arterial and vascular diseases including coronary thrombosis, and the like, is nutritional in origin. During this time period, several changes have taken place in our national diet and eating habits which have resulted in a relative deficiency in such diet of what is termed essential fatty acids, hereinafter referred to for convenience as EFA. It is this deficiency which has been directly blamed by many medical experts as triggering the acceleration of the degenerative diseases named. Notwithstanding the fact that one century ago infectious diseases took a great toll, the life expectancy of the average middle-aged male in the United States is now only a few years greater than it was at that time. One death now occurs from cardiovascular disease for every death that a century ago was caused by an infectious disease. Heart diseases have become the greatest single cause of death in the Western World.

It has also been estimated that vascular diseases, commonly called hardening of the arteries, accounts for approximately half of all deaths in the United States. Presently about 25 percent of the medical profession is practicing some form of dietary restriction in the treatment of vascular diseases. The American Heart Association has stated that fat in diet should be cut in half and that calorie restriction and weight reduction should be applied both for prevention and cure.

Essential fatty acids have gradually disappeared from our foodstuffs. Due to modern milling practice in making bleached white flour, essential fatty acids normally found in whole wheat have not been nearly as available as formerly. Also, the anti-oxidants have disappeared. Much of the vitamin E is lost with the wheat germ. Of that which remains, most is destroyed by the bleaching action of strong oxidizers. In the processing of vegetable oils, a substantial portion of the anti-oxidants are also lost in the refining process.

In addition, cooking substances such as lard which contain essential fatty acids have been to a great extent replaced by hydrogenated vegetable oils. Lard and the like which do contain EFA have poor keeping qualities and become rancid rather quickly. On the other hand the hydrogenated vegetable oils which are solid fats at room temperature keep indefinitely under refrigeration and therefore their use has rapidly increased. However, in the hydrogenation of vegetable oils, practically all of the essential fatty acids are converted to saturated fats, and most of that which does remain is converted to the unnatural isomer form, namely, the trans form. For reasons not known, the unnatural isomers of essential fatty acids behave chemically as though saturated with respect to human metabolism. For example, if the cholesterol esters carried in the bloodstream are of the unnatural isomers of essential fatty acids, the former are stable and do not lend themselves either to the process of cell repletion or to oxidation. Consequently, these cholesterol esters build up in the blood stream and deposit along the walls of arteries. Further, even peanut butter, which was formerly a good source of essential fatty acids, is now made with hydrogenated peanut oil and therefore represents a further loss of such fatty acids from our diet.

The consumption of potato chips and foods fried in hydrogenated fats likewise has material increased, such that dietary habits have shifted away from consuming essential fatty acids and toward saturated fats and the unnatural isomers of essential fatty acids which are believed to the atheroma-forming fats.

According to one school of thought in medical schools, the deficiency of sufficient essential fatty acids in diets raises the cholesterol content in the bloodstream. In time atheroma, a yellow waxlike substance, forms and deposits along the arteries. Atheroma is composed largely of the cholesterol esters of saturated fats and the esters of the unnatural isomers of essential fatty acids. As the arteries become clogged, cardiovascular diseases develop. Even more serious, as atheroma forms, capillary fragility occurs to a marked degree. Fragility of capillary membrane and resultant breaks of the endothelium are suspected of being a prime cause of thrombosis or blood clots.

I have now developed a process of providing an edible oil product exceptionally rich in essential fatty acids. The oil may thus be used as a cooking oil in the preparation of other foods and is designed particularly to incorporate a sufficient amount of EFA in a diet while at the same time materially reducing or almost completely eliminating saturated fats. Such a diet may be followed by those wishing to reduce weight, or those suffering from arterial diseases, or those seeking to guard against the occurrence of such diseases. Specific means are employed to maintain my edible oil product in its desired unoxidized state until use. In one form of the invention, a complete meal can be prepared containing the present edible oil and designed with calorie content in mind as well as EFA content. A meal can be suitably stored under refrigeration until it is desired to prepare the meal for consumption.

It is, therefore, a principal object of the present invention to provide a novel food product.

Another object is to provide an edible oil adapted for use in the preparation of other foods.

A further object is to provide a cooking oil adapted to effect a dietary change in food prepared therewith by introducing an increased amount of essential fatty acids.

A still further object is to provide a cooking oil for use in the preparation of other foods forming part of a diet designed for weight reducing, patients suffering from arterial diseases, or as a safeguard against the occurrence of such diseases.

A still further object is to provide a cholesterol depressant.

A still further object is to provide a deep frozen food or complete meal containing a food prepared with the present edible oil and affording a proper balance among the exact calorie, EFA, protein, carbohydrate, and other fat contents, the saturated fat content being materially restricted.

Other objects of the invention will become apparent as the description proceeds.

To the acomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

The accompanying drawing is a schematic flow diagram of one form of the present process by which the edible oil is produced. The drawing is illustrative only and should not be taken as imposing limitations on the claims.

When oils are first recovered from grain, they are in the crude state and contain considerable amounts of strong anti-oxidants such as phosphatides (lecithin), sterols, and tocopherols. Before marketing the grain oils for use as food or for further processing into food products, it is the present practice to refine the oils by removing the gum, as by heating the oil with caustic soda. In this process, most of the lecithin and a large percentage of the sterols, tocopherols, and other anti-oxidants are removed and generally discarded as soap stock. This removal of the gum and crude substances in the grain oils is carried out largely because such substances retard any subsequent hydrogenation reaction and therefore must be removed to make commercial hydrogenation feasible. Also, the crude oils are dirty brown and black in color and the crude lecithin settles out to form a dirty black gum at the bottom of a container such as a glass. Such a product has little or no sales appeal, and the gum and crude substances are therefore normally removed to make the resulting oil acceptable to the purchasing public.

In general, I process grain, preferably freshly harvested, to recover an oil rich in polyunsaturated fatty acids, especially EFA, and natural anti-oxidants, the oil then being fortified with additional anti-oxidants and finally kept at sufficiently low temperatures to inhibit oxidation. In carrying out the present process, I depart from prior practices in several respects. Initially the grain is processed under conditions of minimum heat and oxidation to obtain an oil rich in the polyunsaturated fatty acids, particularly the essential fatty acids, and whatever natural esters or other natural derivatives of such acids as may be present in the oil. This oil is not refined as above described. Moreover, crude gum is then blended with the oil to fortify it with a further supply of anti-oxidants. The crude gum may be obtained from grain which has been similarly treated to supply its oil, the latter then being refined to separate the crude gum. The so-called refined oil is discarded. Preferably, the grain used to provide the crude gum is also processed under conditions of minimum heat and oxidation. The mixture of oil and gum is then maintained at a sufficiently low temperature, such as in deep freeze, to inhibit oxidation of the polyunsaturated fatty acid materials including the essential fatty acids until such time as it is desired to use the mixture in cooking or otherwise preparing foods for consumption.

As used herein, the term "grain" is used broadly to comprise all sources of oil referred to in the art broadly as vegetable oil. For example, I include not only commonly known grains such as wheat, corn, rice, and soya, but also various grown products usually referred to as seeds, such as sunflower, safflower, flax, and sesame seeds. The oil obtained from flax seeds is commonly known as linseed oil. Further, nuts and the like, such as walnuts and peanuts, and also olives are a source of oil rich in polyunsaturated fatty acid materials contemplated by the present invention and are therefore included by the general term "grain."

The grain is processed as indicated under conditions of minimum heat and oxidation and preferably in a cold state, although this is more inefficient and expensive, to obtain the crude vegetable oil. This can be accomplished either by cold pressing the grain or by solvent extraction. By "cold pressing" I contemplate grain pressing as known in the art, except that instead of carrying out the pressing at temperatures in the neighborhood of 400° F. as is the present practice, I do not heat the grain or exudated vegetable oil over 230° F. and preferably much lower, that is, under 150° F. Similarly, in solvent extraction, the grain is treated with a solvent, such as hexane, to dissolve away the grain oils. Thereafter, the mixture of hexane and resultant solute is heated to drive off the solvent and leave the crude vegetable oil. In the present invention, this mixture should not be heated over 230° F. and preferably vacuum stripping is simultaneously employed, using a pressure no higher than about 60 millimeters of mercury and preferably about 15 to 30 millimeters of mercury. If desired, the two processes can be combined as by lightly cold pressing the grain as a first stage and then following this treatment with solvent extraction.

Analysis of some of the grain oils obtained in this manner includes the following as examples:

|  | EFA by weight percent |
|---|---|
| Corn oil | 55 |
| Sunflower oil | 60 |
| Cotton seed oil | 48 |
| Olive oil | 15 |
| Walnut oil | 68 |
| Peanut oil | 26 |
| Safflower oil | 70 |
| Soya oil | 55 |

The crude vegetable oil so obtained is rich not only in the polyunsaturated fatty acid materials (including natural esters and other natural derivatives of the acids), but the oil retains the natural anti-oxidants, such as tocopherols. The fatty acid materials include those having a carbon chain length of at least 10 carbon atoms and no longer than 20 carbon atoms. Another method of identifying such acids is that the fatty acid materials as herein contemplated preferably have an iodine number of at least 115.

By far the most efficacious of the polyunsaturated fatty acids are those referred to as the essential fatty acids which appear to have the greatest activity in human metabolism. The essential fatty acids include predominantly linoleic acid and, in addition, also linolenic acid and arachidonic acid.

The crude vegetable oil initially obtained from the grain is not further refined. This oil, therefore, is much more resistant to oxidation than refined vegetable oil wherein a good portion of the natural anti-oxidants are removed, particularly to facilitate hydrogenation of the refined oil. The resistance to oxidation of the crude vegetable oil as used in the present invention is a very desirable quality for the double bonds on the unsaturated essential fatty acids are highly susceptible to oxidation. Once oxidized, these materials become harmful for such oxidized fats in turn cause the oxidation of EFA in the body. The human body can produce saturated fatty acids but is incapable of producing the unsaturated essential fatty acids.

The crude vegetable oil is next blended with the crude gum rich in natural anti-oxidants, especially crude lecithin. The crude gum is procured from grain that is preferably treated as initially described for the grain from which the crude vegetable oil is derived, that is, under conditions of minimum heat and oxidation. In fact, the crude gum can be produced from vegetable oil rendered from the same grain or the crude gum can be obtained from a separate batch operation. In any event, the crude gum may be obtained from crude vegetable oil as by permitting the gum to settle out and decanting the unwanted portion. By one technique, the crude vegetable oil is first slightly hydrated by adding a small amount of water to the crude vegetable oil as recovered from the grain. At this point the crude vegetable oil is at a temperature range from about room temperature up to about 100° F. The water addition causes the crude lecithin and anti-oxidants to settle out to form the gum. The settlings or gum may contain about 25 percent water, about 25 percent crude oil and about 50 percent lecithin, as an example, lecithin being rich in anti-oxidants.

By blending the resulting crude gum rich in natural anti-oxidants with the non-degummed crude vegetable oil, the latter is further fortified against oxidation to preserve the fatty acid materials and especially the EFA in their highly important and critical unoxidized state. Such blending may be effected merely by mechanical mixing. In this regard it is emphasized that lecithin plays still a further important role in that lecithin acts as an emulsifying agent in forming the blend of crude vegetable oil and crude gum. No other emulsifier is needed. A desired blend comprises about 60 to about 97 parts by weight of crude vegetable oil to about 3 to about 40 parts by weight of crude gum. A preferred blend comprises about 75 parts by weight of crude vegetable oil with about 25 parts by weight of crude gum, that is a 3:1 ratio. In this way the natural anti-oxidants in the crude oil are multiplied by a considerable factor.

The importance of adding natural anti-oxidants in the form of the crude gum is emphasized. Even with sufficient EFA in the diet, advantage of its presence cannot be realized without the additional presence of anti-oxidants, of which vitamin E is a good example. If EFA is present with saturated fats but without anti-oxidants, the body oxidizes the EFA to energy in preference to oxidizing the saturated fats, and thus still creates an EFA deficient state while leaving the saturated fats to form atheroma as previously mentioned. Thus, the body oxidizes EFA to energy rather than to metabolize it into its vital cell building functions. On the other hand, if a strong anti-oxidant is present in the body, the body oxidizes EFA and saturated fats to energy at substantially the same rate, thus leaving some EFA available for cell repletion. For instance, safflower seed oil is quite rich in EFA but quite deficient in anti-oxidants. Therefore, this seed oil without protection against oxidation is particularly subject to this objection.

After blending the vegetable oil and gum, the mixture is then maintained under a deep freeze continuously to guard against oxidation of the fatty acid materials and to guard against any tendency of the gum to separate from the oil. The so-called deep freeze may be carried out in accordance with techniques known in the food industry. In general, I have found that the blended oil and gum should be kept at a temperature within the range of about 0° F. to about minus 20° F. This can be accomplished conveniently by standard home refrigerator and deep freeze units. Subsequently the edible oil may be taken from cold storage and used as the principal source of fat in the preparation of other foods, such as a waffle or biscuit or even incorporated with foods like ice cream. Also a blend of vegetable oil or gums from different grains can be used. One desirable oil composition comprises equal parts of crude soya oil and crude corn oil.

It is also within the contemplation of my invention to prepare a food product like a waffle or a biscuit or even entire meals using the present edible oil, and then to deep freeze such food product or meal which can be marketed as such. In this case, a user merely warms and serves the prepared food or meal which, because of the presence of EFA obtained as described, provides the same advantages as those obtained from foods prepared conventionally and directly with my edible oil product.

A frozen food product, including a frozen meal of the type described, serves several advantages. For example, to carry to an extreme a diet having an insured quantity of EFA and to eliminate all saturated animal fats usually results in a protein shortage, protein malnutrition itself also being a health hazard. Further, weight reducing programs are usually subject to protein-starvation. In such programs, it is difficult for one to gauge his actual calorie intake.

Accordingly, a food product prepared with the edible oil of the present invention, such as a waffle, can be marketed alone or in connection with other food products in the form of one or more meals, all deep-frozen. The advantages of such a marketed product would be:

(1) A definite ceiling on calories.
(2) A sufficient amount of essential fatty acids.
(3) A limited amount of saturated fatty acids, and
(4) Sufficient protein.

For instance, in 500 calories of a waffle, it is possible to use 20 grams of the present edible oil or ⅔ or a day's requirement. Similarly, deep frozen meals can be made to have exact calorie, EFA, protein, carbohydrate, and other fat contents. These meals can be predominantly vegetarian and sea food in nature. The shell fish, flounder and cod are low in fat, and small amounts of broiled chicken and lean pork can be used, especially if the chicken and pigs are fed on food high in EFA content.

As one example, these meals would have the following in common:

(1) From 10 to 15 grams per day of EFA associated with the crude lecithin, sterols, and other anti-oxidants present in the grain.
(2) A minimum of 50 grams of protein and a minimum of 2.0 grams of methionine the limiting amino acid in most proteins.
(3) A maximum of saturated fatty acids not to exceed thirty grams per day.
(4) An exact total calorie content of around 1400 calories per day. As different persons have different energy requirements, the meals would be put up showing different calorie levels. In all cases the meal would have a calorie content of either less than energy requirement when used for weight reduction or equal to energy requirement where no weight reduction is desirable. If calories in excess of energy requirement are used, the body will convert carbohydrates into saturated fats and defeat my purpose of drastc restriction of saturated fats.
(5) All the meals to be held in the deep frozen condition except for such time as they are being cooked.

To comply with all the indicated requirements and still have a food that is palatable is quite difficult. A deep frozen waffle prepared as described does meet these requirements. For instance, one package can be prepared supplying 850 calories the proper amount of EFA, and 35 grams of protein. Eaten with a pint of skimmed milk and low calorie, leafy green vegetables, everything essential to a diet is supplied with a calorie control between 1000 and 1300 calories. It is practically impossible to meet these basic requirements by putting together mixed meals in a home kitchen. Meals as well as individual food products can be made with precise calorie content and protein and essential fatty acid content kept in mind the same as in the case of waffles.

It will now be apparent that I have provided a novel food product adapted for use in the preparation of other foods. My edible oil can be used to effect a dietary change in food prepared with the oil by introducing an increased amount of essential fatty acids. Food prepared with the present oil are well adapted for diets designed for weight-reducing, patients suffering from arterial diseases, or merely as a safeguard against the occurrence of such diseases. If desired the oil may be used to prepare a food product or a complete meal which is marketed as a complete unit in a deep frozen condition.

Other forms embodying the features of the invention may be employed, change being made as regards the features herein disclosed, provided those stated by any of the following claims or equivalent of such features be employed.

I therefore particularly point out and distinctly claim as my invention:

1. A substantially oxidation-free process of preparing an edible oil having substantially no oxygen present as part of a peroxide radical for use in the preparation of a food product, comprising the steps of extracting from a first charge of grain at a temperature below about 230° F. and in the absence of caustic refining an unctuous first yield containing a substantial portion of the polyunsaturated fatty acid materials in such grain, said temperature maintaining such materials in a substantially unoxidized state, said fatty acid materials having a chain length of ten to twenty carbon atoms and an iodine number of at least 115, extracting from a second charge of grain at a temperature below about 230° F. a second unctuous yield, separating from the second yield the anti-oxidants including crude gum, admixing such unctuous first yield with such anti-oxidants to form the edible oil, and then freezing the admixture until needed for such use to maintain the admixture substantially free of said peroxide oxygen.

2. The process of claim 1 wherein such extracting step for the charges of grain is solvent extraction to obtain the defined oil.

3. The process of claim 1 wherein such extracting step for the charges of grain is pressing the grain to extract the defined oil.

4. The process of 1 wherein such grain is selected from the group consisting of wheat, corn, rice, soya, sunflower seed, safflower seed, flax seed, sesame seed, walnuts, peanuts, and olives.

5. A substantially oxidation-free process of preparing an edible oil having substantially no oxygen present as a peroxide radical, said oil being adapted for use in the preparation of a food product, comprising the steps of pressing a first charge of grain at a temperature below about 230° F. and in the absence of caustic refining to obtain an unrefined unctuous first yield containing a substantial portion of essential fatty acids in such grain at a sufficiently low temperature to maintain the essential fatty acids in a substantially unoxidized state, such essential fatty acids having a chain length of ten to twenty carbon atoms and an iodine number of at least 115, pressing a second charge of the same grain at a temperature below about 230° F. to obtain therefrom a second unctuous yield, separating from the second yield the anti-oxidants including crude gum and lecithin, admixing about sixty to ninety parts by weight of the first yield with about three to forty parts by weight of the anti-oxidants wherein the lecithin serves also as an emulsifying agent to facilitate the admixing and formation of the edible oil, and then deep freezing the admixture at a temperature within the range of about 0° F. to about minus 20° F. until needed for such use to maintain the admixture substantially free of said peroxide oxygen.

6. The process of claim 5 wherein such essential fatty acids comprise an acid selected from the group consisting of linoleic acid, linolinic acid, and arachidonic acid.

7. The process of claim 5 wherein said grain is soya.

References Cited in the file of this patent

UNITED STATES PATENTS

| 2,060,587 | Newton et al. | Nov. 10, 1936 |
| 2,168,532 | McMath et al. | Aug. 8, 1939 |
| 2,674,536 | Fisher | Apr. 6, 1954 |

FOREIGN PATENTS

| 515,481 | Great Britain | Dec. 6, 1939 |

OTHER REFERENCES

Farmer's Bulletin #751, U.S.D.A., entitled Peanut Oil, by Thompson et al., pages 3 to 18.

U.S. Dept. of Agriculture Yearbook, 1916 (article by H. S. Bailey), pp. 159 to 176.

Industrial and Engineering Chemistry, March 1935, vol. 27, No. 3, pp. 329 to 331.

Modern Packaging, November 1946, pp. 130–131.